Dec. 9, 1930.  R. E. WESTPHAL  1,784,213
SEALING TOOL
Filed Aug. 22, 1927
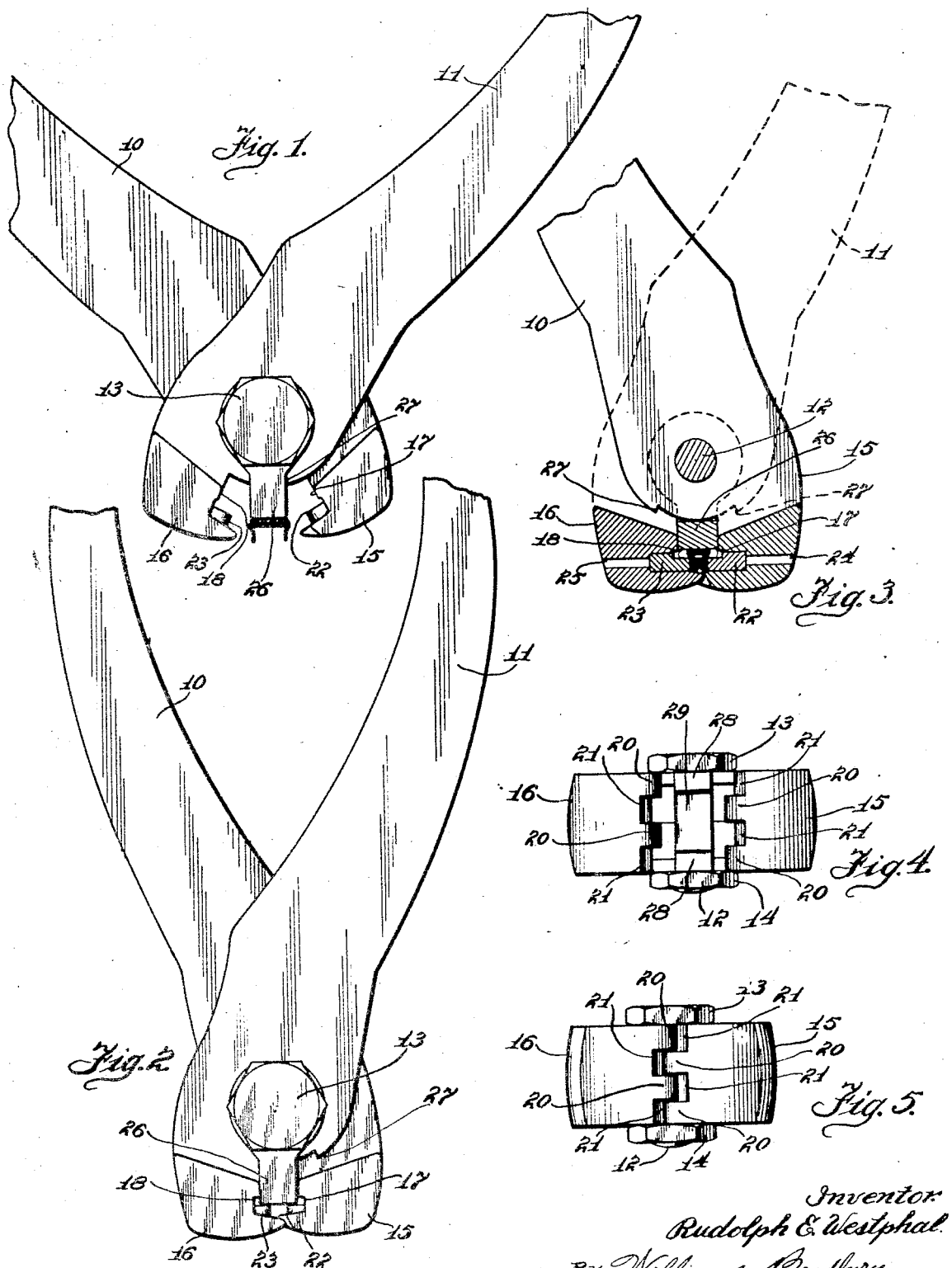
Inventor
Rudolph E. Westphal
By Williams, Bradbury,
McCaleb & Hinkle
Attorneys.

Patented Dec. 9, 1930

1,784,213

UNITED STATES PATENT OFFICE

RUDOLPH E. WESTPHAL, OF CHICAGO, ILLINOIS, ASSIGNOR, BY MESNE ASSIGNMENTS, TO SIGNODE STEEL STRAPPING COMPANY, A CORPORATION OF DELAWARE

SEALING TOOL

Application filed August 22, 1927. Serial No. 214,509.

My invention relates to sealing tools.

More particularly it relates to a sealing tool of the type used to join the overlapping ends of metal bands employed to bind packages, such as groups of merchandise, bales, boxes, crates and the like. A well known and extensively used tool of this general character is illustrated in United States Patent No. 1,038,109, granted September 10, 1912.

In the use of a sealing tool of the kind illustrated in the aforementioned patent the band is tightened about the package and, after application of a suitable channel shaped sleeve or girth such, for example, as illustrated in United States Patent No. 1,445,330, granted February 23, 1913, the sleeve and overlapping band ends are simultaneously subjected to an edge-wise deforming or crimping operation by the sealing tool so that the ends of the band and the sleeve are made to form a joint or seal whereby they are held together under the previously created tension. To insure ease and speed of application, the sleeve or girth must initially fit loosely upon the overlapping band ends and in consequence there is considerable clearance between the walls of the longitudinal grooves of the sleeve and the edges of the band.

A difficulty encountered with the sealing tools heretofore used is that the flanges of the sleeves or girths are not sufficiently turned or tucked under the bands prior to the deforming operation. In consequence, the girth or sleeve often is not drawn sufficiently tight against the edges of the band and particularly in the region of greatest deformation, the edges of the girth flanges are extruded inwardly toward the package, thereby forming projections that frequently chafe the package and its contents and prevent the seal or joint from lying flat on the package. Furthermore, because of this inward extrusion, the resistance of the girth flanges against spreading or separation under the tension of the band is lessened and the joints do not withstand as much tension as they might if the extrusion was eliminated. Ordinarily these difficulties become more pronounced as the thickness of the girth metal is increased so that it has been impossible greatly to raise the strength of the joints produced by employing sleeves or girths of greater thickness.

One of the objects of my invention is to provide an improved sealing tool.

Another object is to provide a tool that will produce a joint that will not chafe the package.

Another object is to provide a tool which will produce a joint that is flat against the package.

Another object is to provide a tool that will produce a stronger joint without changing the character of the materials used in making it.

Another object is to provide a tool that will produce a satisfactory seal or joint with material of greater thickness than satisfactorily used heretofore.

Another object is to provide a tool that will operate easier than those heretofore used.

Another object is to provide a tool that is simple, reliable and inexpensive to manufacture.

Other objects and advantages will hereinafter appear.

An embodiment of the invention is illustrated in the accompanying drawing wherein:

Fig. 1 is a side elevation of a tool in open condition as applied to the work, which is shown in position between the jaws;

Fig. 2 is a side elevation with the jaws in closed position at the end of the sealing operation;

Fig. 3 is a longitudinal sectional view with the jaws closed;

Fig. 4 is a bottom view of the jaws in open position; and

Fig. 5 is a bottom view of the jaws closed.

The tool comprises a pair of levers or handles 10 and 11 hinged together by a pivot pin 12 so that they may be operated like a pair of shears. Pivot pin 12 may be in the form of a bolt having an integral head 13 at one end and a removable nut 14 at the other. The upper ends of the handles may be extended sufficiently to give the desired leverage and may be provided with suitable grips to facilitate the users holding and operating them. Levers 10 and 11 are provided with jaws 15 and 16 respectively. These jaws confront or face each other and are provided with complementary recesses or grooves 17 and 18 respectively which form a channel for the reception of the overlapping band ends and encircling sleeve and for the tool anvil or chair to be hereinafter described. The wedge shaped lips or forward terminals of jaws 15 and 16 are formed with alternate projections 20 and notches 21 positioned so that the projections or teeth of one jaw intermesh or fit into the notches of the other jaw when the tool is closed.

Centrally located in the face of each jaw 15 and 16 is a curve-faced deforming pin 22 and 23 respectively, which may be in the form of hardened inserts tightly fitting into sockets in the faces of the jaw recesses. The best results have been attained by forming the confronting faces of these pins on substantially semi-circular arcs. To their rear ends these deforming pin sockets may be extended through the jaws as relatively small holes 24 and 25, respectively, through which a suitable tool may be inserted and driven to force out the deforming pins should it become desirable because of breakage or other causes to remove them.

An anvil or seat 26 lies in the channel formed by the jaw recesses. This seat or chair is shaped like a stirrup having two parallel legs through which bolt 12 is adapted to pass to pivotally connect it in place. When the jaws are fully open a shoulder 27 on each lever engages the side of the seat or anvil so as to centrally position the same in the channel between the jaws as shown in Fig. 1. When the jaws are completely closed the seat is likewise held in central position by the faces of the jaws engaging the same, as clearly shown in Figs. 2 and 3. Between these two extreme lever positions, however, the chair or anvil is free to pivot about bolt 12. The opposite ends 28 of seat 26 project slightly beyond the intervening portion so as to provide a central depression 29 to accommodate a slight elevation or bulging of the band ends and sleeve at the region of greatest deformation, as will be hereinafter described.

In operation the jaws are opened and the tool set down over the previously tensioned band, to whose overlapping ends a channel shaped sleeve has been applied, until the chair or stirrup touches the band as shown in Fig. 1. Then the handles of the tool are brought together to clamp edge-wise restricted and oppositely positioned regions of the overlapped bands and sleeve, the final position being shown in Fig. 2. During the first stages of this clamping action the lips of the jaws fold or tuck the flanges of the sleeve tightly around the edges of and under the bands. The interfitting notch and projection formation of the jaws permits the location of the deforming pins 22, 23 well behind their tips so that the tucking under of the sleeve flanges may be fully done before the edge-wise sealing or interlocking deformation begins. Thus the initially necessary clearance heretofore mentioned is removed and the sleeve flanges clamp the edges of the overlapping bands tightly together. Furthermore, this construction permits the jaws completely to underlie the joint throughout the clamping action so that the sleeve flanges when once drawn tightly about the edges of the band and tucked under flat against the lower band are retained in this condition and prevented from bulging or extruding inwardly or toward the package. After the flanges are thus drawn about the edges of and tucked under the bands, further closing of the jaws brings the deforming pins 22, 23 into action whereupon the opposite edges of the bands and sleeves are deformed toward each other in sharply defined, restricted areas conforming quite closely to the curvature of the deforming pins.

The edge-wise deformation is accommodated by an outward bulge of the sleeve and band in the deformed area, limited by engaging the intermediate off-set area of the anvil or chair, and because of the intermeshing of the jaws to prevent inward extrusion of the flanges, the flanges turn outwardly into the bulge as clearly shown in Fig. 3, rather than inwardly or toward the package as with former tools. Thus the characteristic bulge in the sleeve and band forms a pocket-like recess for the deforming flanges and an exceedingly compact, tight and strong joint is produced. Because the flanges or edges of the sleeve are folded tightly about the edges of and tucked under the bands initially, held there during the further closing of the jaws and forced outwardly into the bulging or deformed pocket, the seal or joint is exceedingly tight and flat on its underside and will lie flat against and close to the package. The sealing operation is accomplished with less effort on the part of the operator because the operations performed by the tool (i. e. the initial folding and tucking of the sleeve flanges and the subsequent edgewise deformation of the sleeve and band) take place in sequence. The deformations can be made deeper because the deforming pins can be permitted to project further beyond the faces of the jaws than with former tools, resulting in a stronger joint with metal of the same gauge or permitting the formation of satisfactory joints with sleeve metal of heavier gauge.

Obviously a sealing tool of the type herein described need not necessarily be constructed of pivotally connected levers but may consist of slidably connected levers, or any other form of interconnected levers providing for a shear-like operation of levers and jaws.

Having thus illustrated and described the nature and one embodiment of my invention, what I claim and desire to secure by United States Letters Patent is as follows:

1. A sealing tool comprising a pair of pivotally connected levers having confronting deforming jaws on one side of the pivot, said jaws each having a projecting lip overhanging the work engaging deforming surfaces of the jaw and a notch for receiving the lip of the other jaw so that when the jaws are closed the lips extend beyond the plane of the center of the pivot.

2. A sealing tool comprising a pair of levers pivoted together to operate like a pair of shears and having confronting deforming jaws on one side of the pivot, each jaw having projecting lips overhanging the work engaging surfaces of the jaws and notches arranged so that the lips of one jaw lie opposite the notches of the other jaw and the length of the lips and depth of the notches being such that the lips extend beyond the plane of the center of the pivot when the jaws are closed.

3. A sealing tool comprising a pair of confronting jaws, means for moving the jaws toward one another, deforming pins in the sides of the jaws for the edgewise deforming of a package band and an anvil between the jaws, said jaws each having a projecting lip and a notch for receiving the projecting lip of the other jaw, so that when the jaws are closed said lips extend beyond the plane of the center of the anvil.

4. A sealing tool comprising a pair of confronting jaws, means for moving the jaws toward one another, deforming pins in the opposed faces of the jaws for the edgewise deforming of a package band when the jaws are closed, and an anvil mounted between the jaws, each of said jaws having a projecting lip, and a notch for receiving the lip of the other jaw, overhanging the anvil whereby movement of the jaws toward one another will confine the package band prior to the edgewise deformation of the band by said deforming pins.

5. A sealing tool for crimping edgewise overlapped metal bands to interconnect the same, comprising a pair of confronting jaws movable toward and from each other in the direction of the plane of the bands, each jaw having a band crimping surface, a projecting lip and a notch, the crimping surface of each jaw lying to the rear of the lip thereof and the notch of one jaw positioned to receive the projecting lip of the other jaw and permit the lips to pass beyond the median plane between the jaws so that the surfaces of the jaws may form a closed flat abutment for preventing extrusion of the crimp therebetween.

6. A sealing tool for crimping edgewise overlapped metal bands to interconnect the same, comprising a pair of jaws pivoted together to move toward each other, each jaw having a projecting lip and a notch, the lip of one jaw being received in the notch of the other when the jaws are brought together so that the projecting lips may pass beyond the median plane between the jaws, and a band-edge crimping surface carried by each jaw to the rear of the projecting lip thereof to come into action to crimp the bands while the overlapping projecting lips prevent extrusion of the crimp between the jaws.

In witness whereof, I hereunto subscribe my name this 11 day of August, 1927.

RUDOLPH E. WESTPHAL.